United States Patent

(12) United States Patent
Hsiao

(10) Patent No.: US 11,797,696 B2
(45) Date of Patent: Oct. 24, 2023

(54) DATA PROCESSING SYSTEM AND METHOD CAPABLE OF CONCEALING FILES AND FOLDERS

(71) Applicant: TRUSTVIEW INC., Taipei (TW)

(72) Inventor: Tsu-Tair Hsiao, Taipei (TW)

(73) Assignee: TRUSTVIEW INC., Taipei (TW)

( * ) Notice: Subject to any disclaimer, the term of this patent is extended or adjusted under 35 U.S.C. 154(b) by 283 days.

(21) Appl. No.: 17/373,350

(22) Filed: Jul. 12, 2021

(65) Prior Publication Data

US 2022/0012350 A1 Jan. 13, 2022

(30) Foreign Application Priority Data

Jul. 13, 2020 (TW) ................................ 109123566

(51) Int. Cl.
*G06F 21/62* (2013.01)
*G06F 16/16* (2019.01)
*G06F 16/17* (2019.01)

(52) U.S. Cl.
CPC .......... *G06F 21/6209* (2013.01); *G06F 16/16* (2019.01); *G06F 16/1734* (2019.01)

(58) Field of Classification Search
CPC ... G06F 21/6209; G06F 16/16; G06F 16/1734
See application file for complete search history.

(56) References Cited

U.S. PATENT DOCUMENTS

| 9,501,658 | B1* | 11/2016 | Gonzalez | G06F 21/6209 |
| 11,051,166 | B1* | 6/2021 | Buliga | H04B 17/14 |
| 2003/0191938 | A1* | 10/2003 | Woods | G06F 21/6209 |
| | | | | 713/165 |
| 2015/0186640 | A1* | 7/2015 | Chou | G06F 21/6218 |
| | | | | 726/22 |
| 2016/0132676 | A1* | 5/2016 | Avganim | G06F 21/45 |
| | | | | 726/18 |
| 2017/0068477 | A1* | 3/2017 | Yu | G06F 3/0623 |
| 2020/0014531 | A1* | 1/2020 | Falco | H04L 63/0884 |
| 2020/0204589 | A1* | 6/2020 | Strogov | H04L 63/1416 |

* cited by examiner

*Primary Examiner* — Vance M Little
(74) *Attorney, Agent, or Firm* — MUNCY, GEISSLER, OLDS & LOWE, P.C.

(57) ABSTRACT

A data processing system and a data processing method are capable of concealing files and folders. The data processing system of the invention includes a data storage device and at least one processor. When an application process is started and executed by the at least one processor to search a designated folder in the data storage device through a storage device driver residing in a kernel mode of an operating system, a storage filter driver residing in the kernel mode of the operating system judges if there are any files in the designated folder which have not been searched, and if any, the storage filter driver retrieves a next file in the designated folder through the storage device driver. If the storage filter driver determines that the application process is untrusted and determines that the next file is a concealed file, the storage filter driver does not return the next file.

10 Claims, 8 Drawing Sheets

DATA PROCESSING SYSTEM AND METHOD CAPABLE OF CONCEALING FILES AND FOLDERS

CROSS-REFERENCE TO RELATED APPLICATION

This utility application claims priority to Taiwan Application Serial Number 109123566, filed Jul. 13, 2020, which is incorporated herein by reference.

BACKGROUND OF THE INVENTION

1. Field of the Invention

The invention relates to a data processing system and a data processing method capable of concealing files and folders, and in particular, to a data processing system and a data processing method that do not return concealed files and concealed folders for untrusted application processes.

2. Description of the Prior Art

Recently, malicious attacks on data processing systems by ransomware have become more and more rampant. Once the data processing system is attacked by ransomware, the ransomware will search for files stored in the data storage device of the data processing system, and then encrypt the searched files. Until the owner of the data processing system pays a ransom to the author of the ransomware in exchange for the encryption key by which the encrypted files can be decrypted.

There are many ways to find out ransomware to prevent the data processing system from being infected with ransomware. However, at present, there is still no effective prevention method for the endless new ransomware attacks. The invention utilizes a way of concealing important files and folders to deal with malicious attacks of ransomware on the data processing system. It should be emphasized here that the way of concealing important files and folders in the invention is different from the way of hiding the attributes of files and folders in current operating system running in the data processing system.

Referring to FIG. 1 and FIG. 2, these figures are schematic diagrams showing pictures of examples of managing file content in a file manager application in a window operating system issued by Microsoft Corporation. As shown in FIG. 1, it is indicated in the dotted frame that the content of the file, named as File A.xlsx., opened by the file manager application includes a hiding option. If the hiding option is checked, the file named as File A.xlsx file will not be displayed. The window of the file manager application will still provide the option to show hidden items. As shown in FIG. 2, if the option to show hidden items shown in the dotted frame is checked, the hidden file named as File A.xlsx, which is not originally displayed, will be displayed in a lower gray scale.

Referring to FIG. 3, FIG. 3 is a schematic diagram showing the architecture of a data processing system 1 of a prior art. As shown in FIG. 3, the data processing system 1 of the prior art includes a data storage device 12 and at least one processor (not shown in FIG. 3).

The data storage device 12 therein stores at least one folder, a plurality of hidden files 1222 and a plurality of unhidden files 1224. In FIG. 3, only a designated folder 122 of at least one folder is shown as a representative. The plurality of hidden files 1222 and the plurality of unhidden files 1224 are sequentially arranged in the designated folder 122 of at least one folder. Each of the hidden files 1222 and the unhidden files 1224 has a respective attribute.

The at least one processor is electrically connected to the data storage device 12, and functions in executing an operating system 10. The operating system 10 has a kernel mode 102 and a user mode 104, and includes system application programming interfaces (system APIs) 106 and storage device driver 108. The system APIs 106 resides in the user mode 104 of the operating system 10, and includes an enumeration API 1062 and file attribute API 1064.

Taking the window operating system as an example, the enumeration API 1062 with functions of displaying the file information list includes FindFirstFile, FindNexFile, etc. The file attribute API 1064 with functions of reading the attribute of the file includes GetFileAttributes and so on. Taking the Linux operating system as an example, the enumeration API 1062 with functions of displaying the file information list includes readdir and so on.

The storage device driver 108 resides in the kernel mode 102 of the operating system 10, and is respectively coupled to the enumeration API 1062, the file attribute API 1064 and the data storage device 12.

Application processes 109, such as trusted window file managers, untrusted ransomware, etc., all reside in the user mode 104 of the operating system 10. Similar to general operating systems, the operating system 10 also provides relative system APIs 106 for the application processes 109 to perform their functions.

When the application process 109 is started and executed by the at least one processor to search for the designated folder 122 in the data storage device 12 through the storage device driver 108, the application process 109 is respectively coupled to the enumeration API 1062 and the file attribute API 1064. The storage device driver 108 sequentially returns the plurality of hidden files 1222 and the plurality of unhidden files 1224 in the designated folder 122, and returns the attributes of the files being returned through the file attribute API 1064. The application process 109 searches for other folders in the data storage device 12, which include the hidden folders and the unhidden folders. The procedure of returning the folders by the storage device driver 108 is similar as described above, and will be not described in detail herein.

Therefore, the method of the prior art of hiding files and folders cannot prevent the data processing system from malicious attacks by ransomware.

SUMMARY OF THE INVENTION

Accordingly, one scope of the invention is to provide a data processing system and a data processing method that do not return concealed folders and concealed files for untrusted application processes, and return concealed folders and concealed files only for trusted application processes.

A data processing system according to a first preferred embodiment of the invention is capable of concealing files and folders. The data processing system according to the first preferred embodiment of the invention includes a data storage device and at least one processor. The data storage device therein stores K concealed folders and a plurality of unconcealed folders where K is a natural number. Each of the K concealed folders and the unconcealed folders has a respective attribute. The at least one processor is electrically connected to the data storage device and functions in executing an operating system. The operating system has a kernel mode and a user mode, and includes an enumeration application programming interface (API), a file attribute API, a storage filter driver and a storage device driver. The enumeration API resides in the user mode of the operating system. The file attribute API resides in the user mode of the operating system. The storage filter driver resides in the kernel mode of the operating system, and includes an enumerator, a filtering module, a trusted process module and a concealed file recording module. The enumerator is coupled to the enumeration API. The filtering module is respectively coupled to the file attribute API and the enumerator. The trusted process module is coupled to the filtering module, and therein stores M first rules and N first characteristics where M is a natural number, and N is an integer equal to or larger than M. Each first rule corresponds to at least one of the N first characteristics. The concealed file recording module is coupled to the filtering module, and therein stores P concealed folder name rules where P is a natural number. Each concealed folder corresponds to one of the P concealed folder name rules. The storage device driver resides in the kernel mode of the operating system, and is respectively coupled to the storage filter driver and the data storage device. An application process resides in the user mode of the operating system, and therein stores M second rules and M second characteristics. Each second rule corresponds to one of the first rules and one of the second characteristics. When the application process is started and executed by the at least one processor to search the folders in the data storage device through the storage device driver, the application process is respectively coupled to the enumeration API and the file attribute API. The storage filter driver judges if there are any folders in the data storage device which have not been searched, and if any, the enumerator retrieves a next folder among the K concealed folders and the plurality of unconcealed folders through the storage device driver, and the trusted process module judges if the application process is trusted in accordance with the M first rules, the N first characteristics, the M second rules and the M second characteristics. And if NO, the filtering module judges if the next folder is one of the K concealed folders in accordance with the P concealed folder name rules. And if YES, the storage filter driver returns without the next folder and continues to judge if there are any folders in the data storage device which have not been searched.

A data processing system according to a second preferred embodiment of the invention is capable of concealing files and folders. The data processing system according to the second preferred embodiment of the invention includes a data storage device and at least one processor. The data storage device therein stores at least one folder, I concealed files and a plurality of unconcealed files where I is a natural number. The concealed files and the plurality of unconcealed files are sequentially arranged in a designated folder of the at least one folder. Each of the concealed files and the unconcealed files has a respective attribute. The at least one processor is electrically connected to the data storage device and functions in executing an operating system. The operating system has a kernel mode and a user mode, and includes an enumeration application programming interface (API), a file attribute API, a storage filter driver and a storage device driver. The enumeration API resides in the user mode of the operating system. The file attribute API resides in the user mode of the operating system. The storage filter driver resides in the kernel mode of the operating system, and includes an enumerator, a filtering module, a trusted process module and a concealed file recording module. The enumerator is coupled to the enumeration API. The filtering module is respectively coupled to the file attribute API and the enumerator. The trusted process module is coupled to the filtering module, and therein stores M first rules and N first characteristics where M is a natural number, and N is an integer equal to or larger than M. Each first rule corresponds to at least one of the N first characteristics. The concealed file recording module is coupled to the filtering module, and therein stores J concealed file name rules where J is a natural number. Each concealed file corresponds to one of the J concealed file name rules. The storage device driver resides in the kernel mode of the operating system, and is respectively coupled to the storage filter driver and the data storage device. An application process resides in the user mode, and therein stores M second rules and M second characteristics. Each second rule corresponds to one of the first rules and one of the second characteristics. When the application process is started and executed by the at least one processor to search the designated folder in the data storage device through the storage device driver, the application process is respectively coupled to the enumeration API and the file attribute API. The storage filter driver judges if there are any files in the designated folder which have not been searched, and if any, the enumerator retrieves a next file among the I concealed files and the plurality of unconcealed files through the storage device driver, and the trusted process module judges if the application process is trusted in accordance with the M first rules, the N first characteristics, the M second rules and the M second characteristics. And if NO, the filtering module judges if the next file is one of the concealed files in accordance with the J concealed file name rules. And if YES, the storage filter driver returns without the next file and continues to judge if there are any files in the designated folder which have not been searched.

A data processing system according to a third preferred embodiment of the invention is capable of concealing files and folders. The data processing system according to the third preferred embodiment of the invention includes a data storage device and at least one processor. The data storage device therein stores L concealed files and a plurality of unconcealed files where L is a natural number. The at least one processor is electrically connected to the data storage device and functions in executing an operating system. The operating system has a kernel mode and a user mode, and includes a file open application programming interface (API), a file read/write API, a storage filter driver and a storage device driver. The file open API resides in the user mode of the operating system. The file read/write API resides in the user mode of the operating system. The storage filter driver resides in the kernel mode of the operating system, and includes a filtering module, a trusted process module and a concealed file recording module. The filtering module is respectively coupled to the file open API and the file read/write API. The trusted process module is coupled to the filtering module, and therein stores M first rules and N first characteristics where M is a natural number, and N is an integer equal to or larger than M. Each first rule corresponds to at least one of the N first characteristics. The concealed file recording module is coupled to the filtering module, and therein stores Q concealed file name rules where Q is a natural number. Each concealed file corresponds to one of the Q concealed file name rules. The storage device driver resides in the kernel mode of the operating system, and is respectively coupled to the storage filter driver and the data storage device. An application process resides in the user mode of the operating system, and therein stores M second rules and M second characteristics. Each second rule corresponds to one of the first rules and one of the second characteristics. When the application process is started and executed by the at least one processor to search a designated file in the data storage device through the storage device driver in accordance with a designated file path and a designated read/write mode, the application process is respectively coupled to the file open API and the file read/write API. The storage filter driver judges if there is the designated file in the data storage device, and if any, the filtering module judges if the designated file is one of the L concealed files in accordance with the Q concealed file name rules. And if YES, the trusted process module judges if the application process is trusted in accordance with the M first rules, the N first characteristics, the M second rules and the M second characteristics. And if NO, the storage filter driver returns without the designated file and returns a message indicating that there is no designated file.

In one embodiment, the M first rules can include an original file name, a certification, an issuer company, a product name, a file size, a file version, and a check sum or other rules.

A data processing method according to a fourth preferred embodiment of the invention is capable of concealing files and folders. A data storage device therein stores K concealed folders and a plurality of unconcealed folders where K is a natural number. Each of the K concealed folders and the unconcealed folders has a respective attribute. At least one processor is electrically connected to the data storage device, and functions in executing an operating system. The operating system has a kernel mode and a user mode, and includes an enumeration application programming interface (API), a file attribute API, a storage filter driver and a storage device driver. The enumeration API resides in the user mode of the operating system. The file attribute API resides in the user mode of the operating system. The storage filter driver resides in the kernel mode of the operating system, and includes an enumerator, a filtering module, a trusted process module and a concealed file recording module. The enumerator is coupled to the enumeration API. The filtering module is respectively coupled to the file attribute API and the enumerator. The trusted process module is coupled to the filtering module and therein stores M first rules and N first characteristics where M is a natural number, and N is an integer equal to or larger than M. Each first rule corresponds to at least one of the N first characteristics. The concealed file recording module is coupled to the filtering module, and therein stores P concealed folder name rules where P is a natural number. Each concealed folder corresponds to one of the P concealed folder name rules. The storage device driver resides in the kernel mode of the operating system, and is respectively coupled to the storage filter driver and the data storage device. An application process resides in the user mode of the operating system, and therein stores M second rules and M second characteristics. Each second rule corresponds to one of the first rules and one of the second characteristics. The data processing method according to the fourth preferred embodiment of the invention is, firstly, to respectively couple the application process to the enumeration API and the file attribute API when the application process is started and executed by the at least one processor to search the folders in the data storage device through the storage device driver. Next, the data processing method according to the invention is by the storage filter driver to judge if there are any folders in the data storage device which have not been searched. If it is determined that there are folders in the data storage device which have not been searched, then, the data processing method according to the invention is by the enumerator to retrieve a next folder among the K concealed folders and the plurality of unconcealed folders through the storage device driver. Subsequently, the data processing method according to the invention is by the trusted process module to judge if the application process is trusted in accordance with the M first rules, the N first characteristics, the M second rules and the M second characteristics. If it is determined that the application process is not trusted, afterward, the data processing method according to the invention is by the filtering module to judge if the next folder is one of the K concealed folders in accordance with the P concealed folder name rules. If it is determined that the next folder is one of the K concealed folders, next, the data processing method according to the invention is by the storage filter driver to return without the next folder, and to continue to judge if there are any folders in the data storage device which have not been searched.

A data processing method according to a fifth preferred embodiment of the invention is capable of concealing files and folders. A data storage device therein stores at least one folder, I concealed files and a plurality of unconcealed files where I is a natural number. The concealed files and the plurality of unconcealed files are sequentially arranged in a designated folder of the at least one folder. Each of the concealed files and the unconcealed files has a respective attribute. At least one processor is electrically connected to the data storage device, and functions in executing an operating system. The operating system has a kernel mode and a user mode, and includes an enumeration application programming interface (API), a file attribute API, a storage filter driver and a storage device driver. The enumeration API resides in the user mode of the operating system. The file attribute API resides in the user mode of the operating system. The storage filter driver resides in the kernel mode of the operating system, and includes an enumerator, a filtering module, a trusted process module a concealed file recording module. The enumerator is coupled to the enumeration API. The filtering module is respectively coupled to the file attribute API and the enumerator. The trusted process module is coupled to the filtering module and therein storing M first rules and N first characteristics where M is a natural number, and N is an integer equal to or larger than M. Each first rule corresponds to at least one of the N first characteristics. The concealed file recording module is coupled to the filtering module, and therein stores J concealed file name rules where J is a natural number. Each concealed file corresponds to one of the J concealed file name rules. The storage device driver resides in the kernel mode of the operating system, and is respectively coupled to the storage filter driver and the data storage device. An application process resides in the user mode of the operating system, and therein stores M second rules and M second characteristics. Each second rule corresponds to one of the first rules and one of the second characteristics. The data processing method according to the fifth preferred embodiment of the invention is, firstly, to respectively coupling to the enumeration API and the file attribute API when the application process is started and executed by the at least one processor to search the designated folder in the data storage device through the storage device driver. Next, the data processing method according to the invention is by the storage filter driver to judge if there are any files in the designated folder which have not been searched. If it determined that there are files in the designated folder which have not been searched, then, the data processing method according to the invention is by the enumerator to retrieve a next file among the concealed files and the plurality of unconcealed files through the storage device driver. Subsequently, the data processing method according to the invention is by the trusted process module to judge if the application process is trusted in accordance with the M first rules, the N first characteristics, the M second rules and the M second characteristics. If it is determined that the application process is not trusted, afterward, the data processing method according to the invention is by the filtering module to judge if the next file is one of the I concealed files in accordance with the J concealed file name rules. If it is determined that the next file is one of the I concealed files, next, the data processing method according to the invention is by the storage filter driver to return without the next file and continue to judge if there are any files in the designated folder which have not been searched.

A data processing method according to a sixth preferred embodiment of the invention is capable of concealing files and folders. A data storage device therein stores L concealed files and a plurality of unconcealed files where L is a natural number. At least one processor is electrically connected to the data storage device and functions in executing an operating system. The operating system has a kernel mode and a user mode, and includes a file open application programming interface (API), a file read/write API, a storage filter driver and a storage device driver. The file open API resides in the user mode of the operating system. The file read/write API resides in the user mode of the operating system. The storage filter driver resides in the kernel mode of the operating system, and includes a filtering module, a trusted process module and a concealed file recording module. The filtering module is respectively coupled to the file open API and the file read/write API. The trusted process module is coupled to the filtering module, and therein stores M first rules, and N first characteristics where M is a natural number, and N is an integer equal to or larger than M. Each first rule corresponds to at least one of the N first characteristics. The concealed file recording module is coupled to the filtering module, and therein stores Q concealed file name rules where Q is a natural number. Each concealed file corresponds to one of the Q concealed file name rules. The storage device driver resides in the kernel mode of the operating system, and is respectively coupled to the storage filter driver and the data storage device. An application process resides in the user mode of the operating system, and therein stores M second rules and M second characteristics. Each second rule corresponds to one of the first rules and one of the second characteristics. The data processing method according to the fifth preferred embodiment of the invention is, firstly, to respectively couple the application process to the file open API and the file read/write API when the application process is started and executed by the at least one processor to search a designated file in the data storage device through the storage device driver in accordance with a designated file path and a designated read/write mode. Next, the data processing method according to the invention is by the storage filter driver to judge if there is the designated file in the data storage device. If it is determined that there is the designated file in the data storage device, then, the data processing method according to the invention is by the filtering module to judge if the designated file is one of the L concealed files in accordance with the Q concealed file name rules. If it is determined that the designated file is one of the L concealed files, subsequently, the data processing method according to the invention is by the trusted process module to judge if the application process is trusted in accordance with the M first rules, the N first characteristics, the M second rules and the M second characteristics. If it determined that the application process is not trusted, afterward, the data processing method according to the invention is by the storage filter driver to return without the designated file and returns a message indicating that there is no designated file.

Compared to the prior art, the data processing system and the data processing method according to the invention conceal important files and folders to deal with malicious attacks of ransomware on the data processing system. Utilizing the data processing system and the data processing method according to the invention, untrusted ransomware cannot search and obtain these files and folders that have been previously operated by a user to be concealed. Inevitably, ransomware cannot encrypt these concealed files and concealed folders. In this way, important files and folders are protected by concealing them. Once the data processing system according to the invention is attacked by ransomware, these concealed important files and folders can be quickly restored in a simple way.

The advantage and spirit of the invention may be understood by the following recitations together with the appended drawings.

BRIEF DESCRIPTION OF THE APPENDED DRAWINGS

DETAILED DESCRIPTION OF THE INVENTION

Some preferred embodiments and practical applications of this present invention would be explained in the following paragraph, describing the characteristics, spirit, and advantages of the invention.

Figure 1:
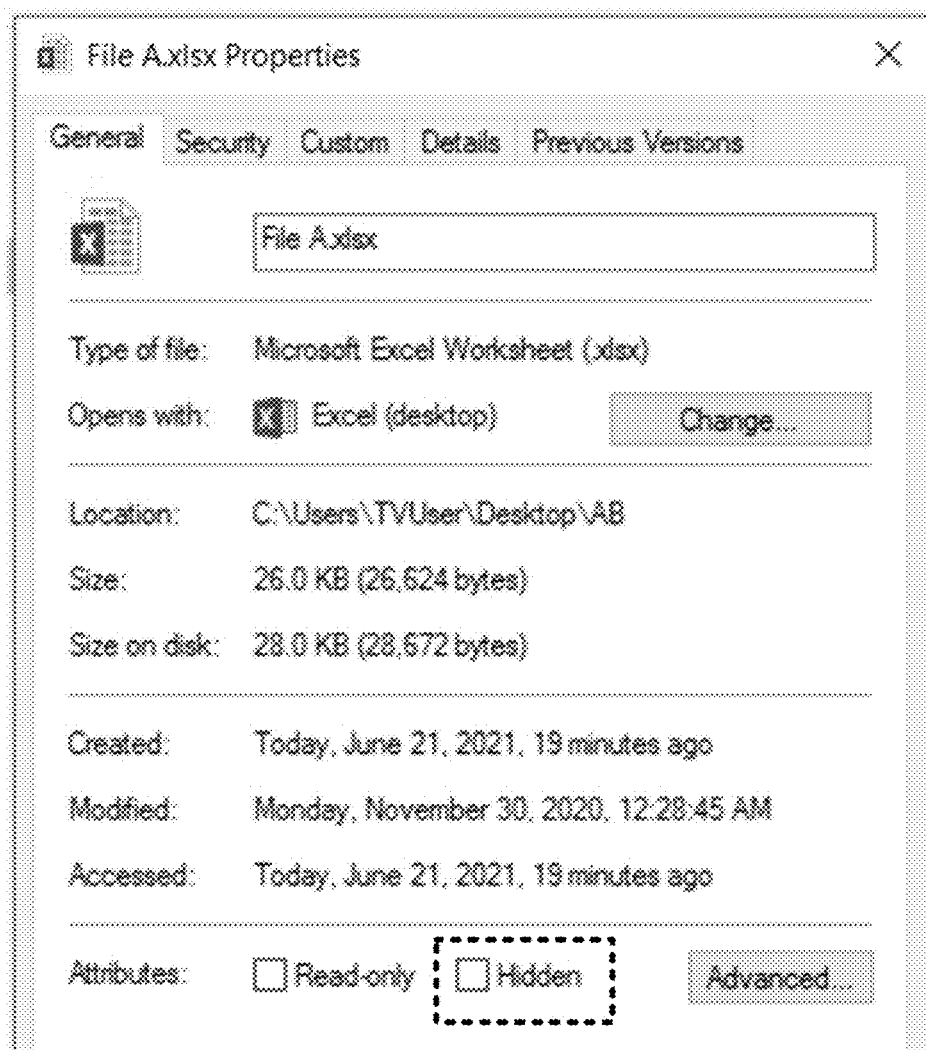
FIG. 1 is a schematic diagram showing a picture of an example of managing file content in a file manager application in a window operating system issued by Microsoft Corporation.
Figure 2:
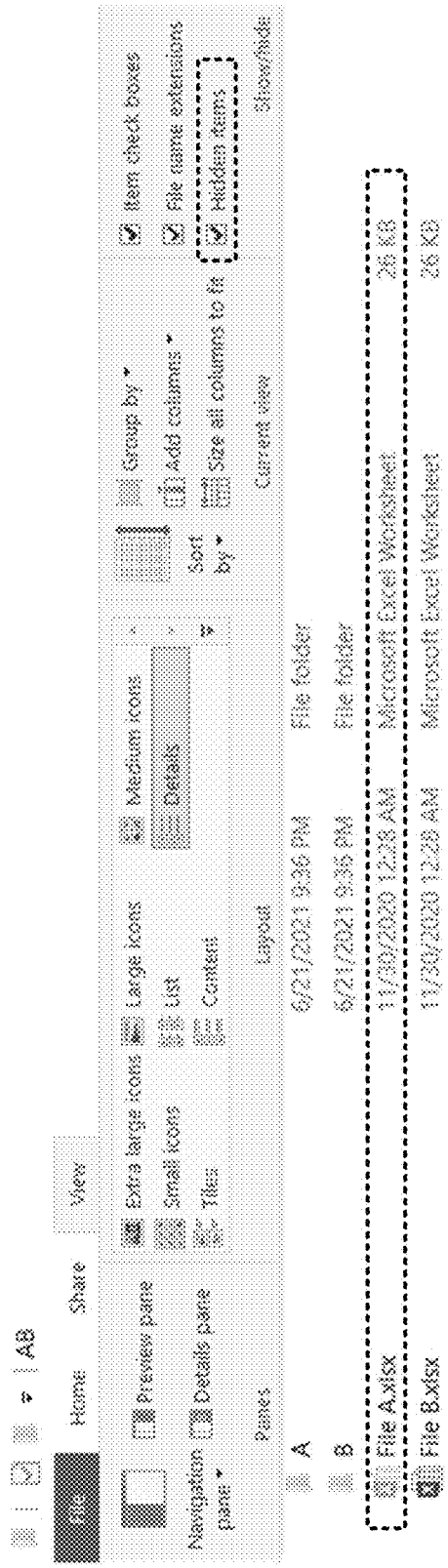
FIG. 2 is a schematic diagram showing a picture of another example of managing file content in a file manager application in a window operating system issued by Microsoft Corporation.
Figure 3:
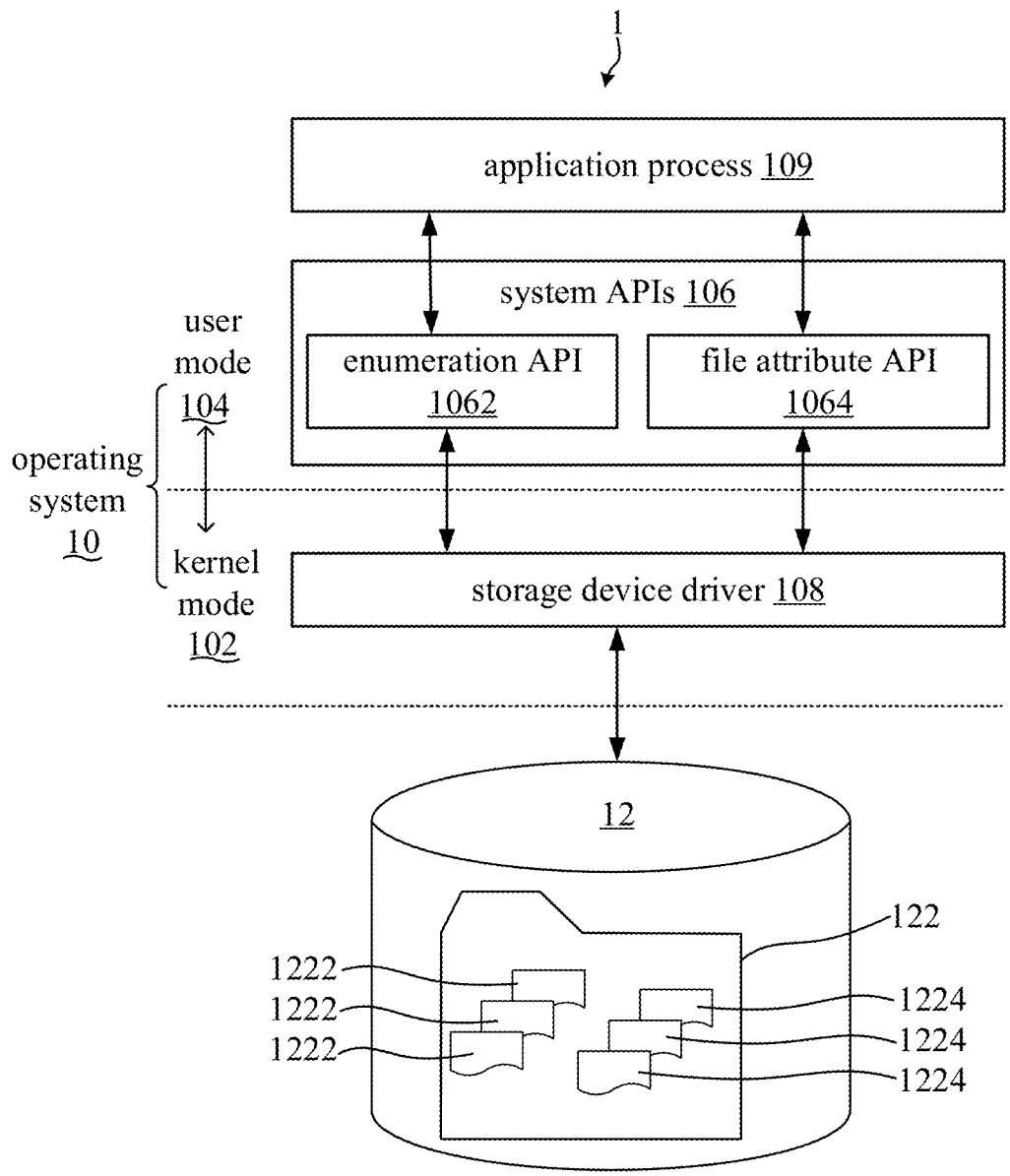
FIG. 3 is a schematic diagram showing the architecture of a data processing system of a prior art.
Figure 4:
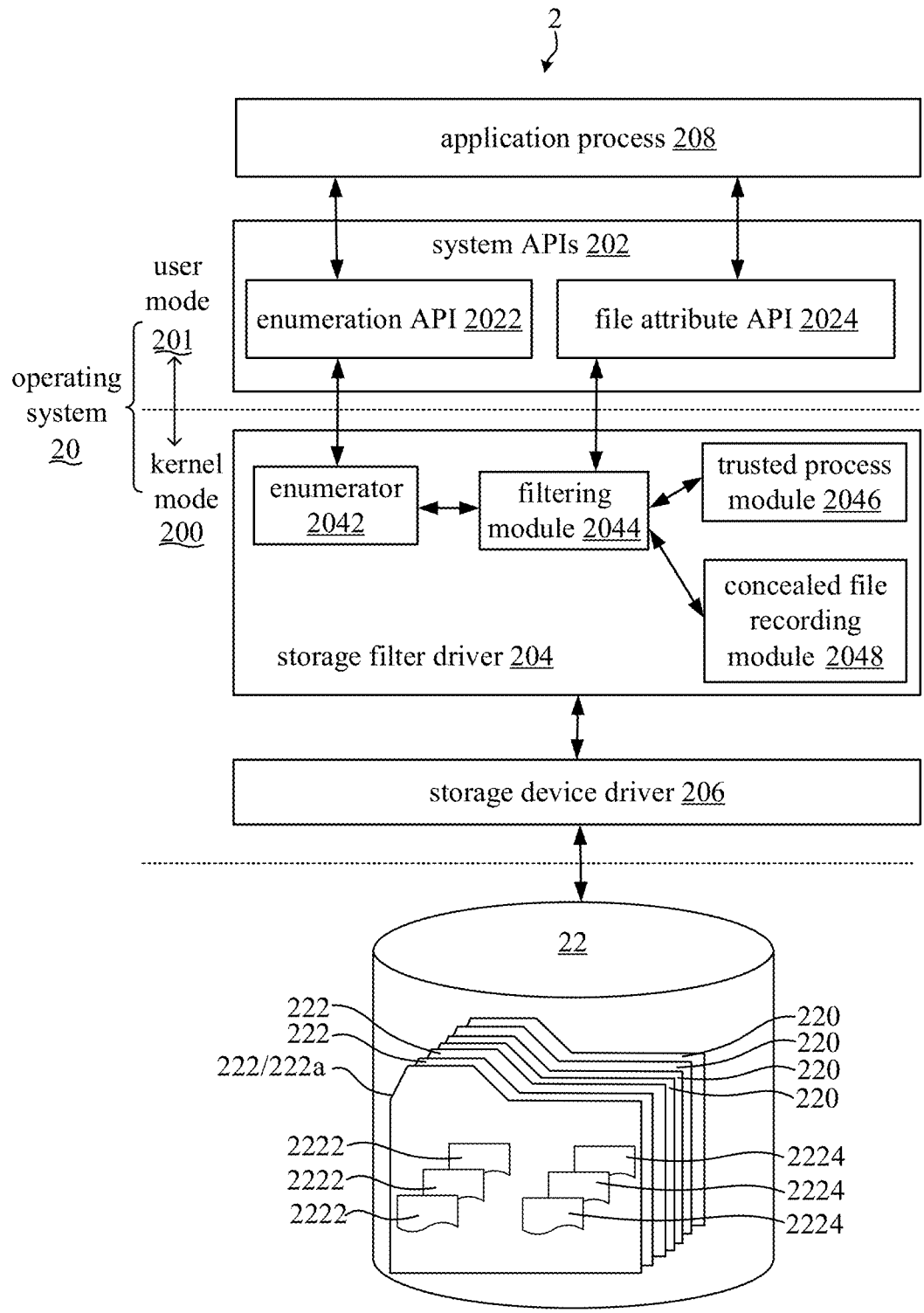
FIG. 4 is a schematic diagram showing the architecture of a data processing system according to the first preferred embodiment and the second preferred embodiment of the invention.

Referring to FIG. 4, the architecture of a data processing system 2 according to the first preferred embodiment and the second preferred embodiment of the invention is illustratively shown in FIG. 4. The data processing system 2 according to the first preferred embodiment and the second preferred embodiment of the invention is capable of concealing files and folders.

In one embodiment, the data processing system 2 according to the invention can be various personal data processing system, such as a notebook computer, a desktop computer, a tablet PC, a smart phones, and so on. The data processing system 2 according to the invention can also be a server.

As shown in FIG. 4, the data processing system 2 according to the first preferred embodiment of the invention includes a data storage device 22 and at least one processor (not shown in FIG. 4). The data storage device 22 therein stores K concealed folders 220 and a plurality of unconcealed folders 222 where K is a natural number. Each of the K concealed folders 220 and the unconcealed folders 222 has a respective attribute.

The at least one processor is electrically connected to the data storage device 22 and functions in executing an operating system 20. The operating system 20 has a kernel mode 200 and a user mode 201, and includes system application programming interfaces (system APIs) 202, a storage filter driver 204 and a storage device driver 206. The system APIs 202 reside in the user mode 201 of the operating system 20, and include an enumeration API 2022 and a file attribute API 2024. The enumeration API 2022 resides in the user mode 201 of the operating system 20. The file attribute API 2024 resides in the user mode 201 of the operating system 20.

The storage filter driver 204 resides in the kernel mode 200 of the operating system 20, and includes an enumerator 2042, a filtering module 2044, a trusted process module 2046 and a concealed file recording module 2048. The enumerator 2042 is coupled to the enumeration API 2022. The filtering module 2044 is respectively coupled to the file attribute API 2024 and the enumerator 2042. The trusted process module 2046 is coupled to the filtering module 2044, and therein stores M first rules and N first characteristics where M is a natural number, and N is an integer equal to or larger than M. Each first rule corresponds to at least one of the N first characteristics. The concealed file recording module 2048 is coupled to the filtering module 2044, and therein stores P concealed folder name rules where P is a natural number. Each concealed folder 220 corresponds to one of the P concealed folder name rules.

The storage device driver 206 resides in the kernel mode 200 of the operating system 20, and is respectively coupled to the storage filter driver 204 and the data storage device 22.

An application process 208, such as trusted window file managers, untrusted ransomware, etc., resides in the user mode 201 of the operating system 20, and therein stores M second rules and M second characteristics. Each second rule corresponds to one of the first rules and one of the second characteristics. Similar to general operating systems, the operating system 20 also provides relative system APIs 202 for the application processes 208 to perform its functions.

When the application process 208 is started and executed by the at least one processor to search the folders in the data storage device 22 through the storage device driver 206, the application process 208 is respectively coupled to the enumeration API 2022 and the file attribute API 2024. The storage filter driver 204 judges if there are any folders in the data storage device 22 which have not been searched, and if any, the enumerator 2042 retrieves a next folder among the K concealed folders 220 and the plurality of unconcealed folders 222 through the storage device driver 206, and the trusted process module 2046 judges if the application process 208 is trusted in accordance with the M first rules, the N first characteristics, the M second rules and the M second characteristics. If the judgment result of the trusted process module 2046 is negative, that is to say, the application process 208 is very likely to be ransomware, the filtering module 2044 judges if the next folder is one of the K concealed folders 220 in accordance with the P concealed folder name rules. If the judgment result of the filtering module 2044 is positive, the storage filter driver 204 returns without the next folder, and continues to judge if there are any folders in the data storage device 22 which have not been searched.

In one embodiment, the M first rules can include an original file name, a certification, an issuer company, a product name, a file size, a file version, a check sum or other rules.

In an example, the M first rules can have only one rule, and the N first characteristics can also have only one first characteristic. For example, any application process signed by Microsoft Corporation is regarded as a trusted application process. At this time, the first rule can be set as "signature", and the first characteristic can be set as "Microsoft Corporation".

In another example, the M first rules and N first characteristics are set to target specific application processes issued by a specific company, for example, Winword.exe issued by Microsoft Corporation. At this time, the M first rules and N first characteristics can be set as: "original file name"="Winword.exe"; "signature"="Microsoft Corporation"; "issuer company"="Microsoft Corporation"; "Product name"="Microsoft Office"; "Sum check"="34458".

Thereby, ransomware cannot be judged as a trusted application process.

Further, if the judgment result of the filtering module 2044 is negative, the storage filter driver 204 returns the next folder through the enumeration API 2022, and returns the attributes of the next folder through the file attribute API 2024.

Further, if the judgment result of the trusted process module 2046 is positive, the storage filter driver 204 returns the next folder through the enumeration API 2022, and returns the attributes of the next folder through the file attribute API 2024.

Also as shown in FIG. 4, the data processing system 2 according to the second preferred embodiment of the invention includes a data storage device 22 and at least one processor (not shown in FIG. 4). The data storage device 22 therein stores at least one folder. In FIG. 4, a plurality of concealed folders 220 and a plurality of unconcealed folders 222 are shown as representatives. The plurality of unconcealed folders 222 includes a designated folder 222a. The data storage device 22 therein also stores I concealed files 2222 and a plurality of unconcealed files 2224 where I is a natural number. The concealed files 2222 and the plurality of unconcealed files 2224 are sequentially arranged in the designated folder 222a. Each of the concealed files 2222 and the unconcealed files 2224 has a respective attribute.

The at least one processor is electrically connected to the data storage device 22 and functions in executing an operating system 20. The operating system 20 has a kernel mode 200 and a user mode 201, and includes system APIs 202, a storage filter driver 204 and a storage device driver 206. The system APIs 202 reside in the user 201 of the operating system 20, and includes an enumeration API 2022 and a file attribute API 2024. The enumeration API 2022 resides in the user mode 201 of the operating system 20. The file attribute API 2024 resides in the user mode 201 of the operating system 20.

The storage filter driver 204 resides in the kernel mode 200 of the operating system 20, and includes an enumerator 2042, a filtering module 2044, a trusted process module 2046 and a concealed file recording module 2048. The enumerator 2042 is coupled to the enumeration API 2022. The filtering module 2044 is respectively coupled to the file attribute API 2024 and the enumerator 2042. The trusted process module 2046 is coupled to the filtering module 2044, and therein stores M first rules and N first characteristics where M is a natural number, and N is an integer equal to or larger than M. Each first rule corresponds to at least one of the N first characteristics. The concealed file recording module 2048 is coupled to the filtering module 2044, and therein stores J concealed file name rules where J is a natural number. Each concealed file 2222 corresponds to one of the J concealed file name rules.

The storage device driver 206 resides in the kernel mode 200 of the operating system 20, and is respectively coupled to the storage filter driver 204 and the data storage device 22.

An application process 208, such as trusted window file managers, untrusted ransomware, etc., resides in the user mode 201 of the operating system 20, and therein stores M second rules and M second characteristics. Each second rule corresponds to one of the first rules and one of the second characteristics. Similar to general operating systems, the operating system 20 also provides relative system APIs 202 for the application processes 208 to perform its functions.

When the application process 208 is started and executed by the at least one processor to search the designated folder 222a in the data storage device 22 through the storage device driver 206, the application process 208 is respectively coupled to the enumeration API 2022 and the file attribute API 2024. The storage filter driver 204 judges if there are any files in the designated folder 222a which have not been searched, and if any, the enumerator 2042 retrieves a next file among the I concealed files 2222 and the plurality of unconcealed files 2224 through the storage device driver 206, and the trusted process module 2046 judges if the application process 208 is trusted in accordance with the M first rules, the N first characteristics, the M second rules and the M second characteristics. If the judgment result of the trusted process module 2046 is negative, that is to say, the application process 208 is very likely to be ransomware, the filtering module 2044 judges if the next file is one of the concealed files 2222 in accordance with the J concealed file name rules. If the judgment result of the filtering module 2044 is positive, the storage filter driver 204 returns without the next file and continues to judge if there are any files in the designated folder 222a which have not been searched.

Similarly, in one embodiment, the M first rules can include an original file name, a certification, an issuer company, a product name, a file size, a file version, a check sum or other rules. Thereby, ransomware cannot be judged as a trusted application process.

Further, if the judgment result of the filtering module 2044 is negative, the storage filter driver 204 returns the next folder through the enumeration API 2022, and returns the attributes of the next folder through the file attribute API 2024.

Further, if the judgment result of the trusted process module 2046 is positive, the storage filter driver 204 returns the next folder through the enumeration API 2022, and returns the attributes of the next folder through the file attribute API 2024.

Figure 5:
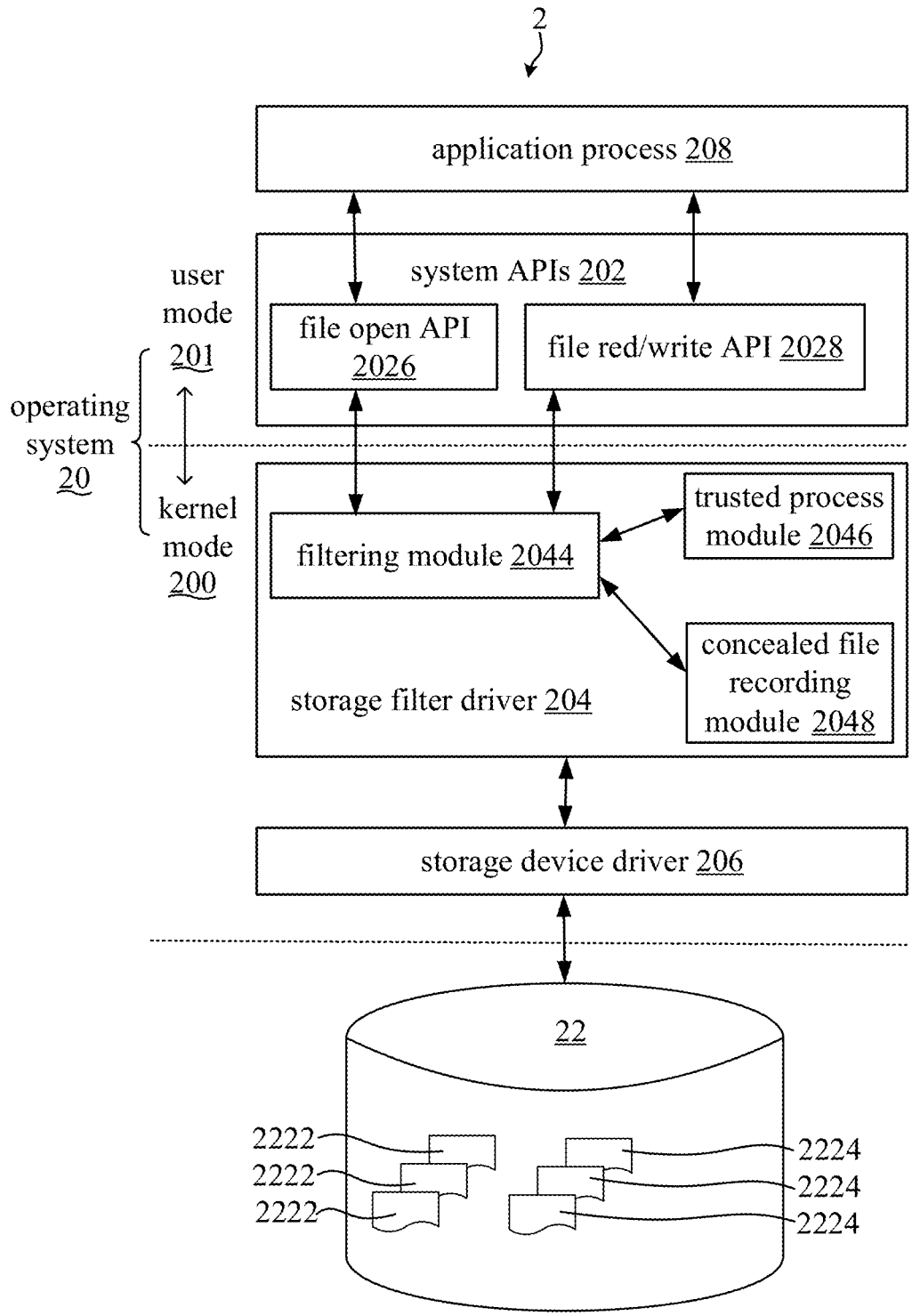
FIG. 5 is a schematic diagram showing the architecture of a data processing system according to the third preferred embodiment of the invention.

Referring to FIG. 5, the architecture of a data processing system 2 according to the third preferred embodiment of the invention is illustratively shown in FIG. 5. The data processing system 2 according to the third preferred embodiment of the invention is capable of concealing files and folders.

As shown in FIG. 5, the data processing system 2 according to a third preferred embodiment of the invention includes a data storage device 22 and at least one processor (not shown in FIG. 5). The data storage device 22 therein stores L concealed files 2222 and a plurality of unconcealed files 2224 where L is a natural number.

The at least one processor is electrically connected to the data storage device 22 and functions in executing an operating system 20. The operating system 20 has a kernel mode 200 and a user mode 201, and includes system APIs 202, a storage filter driver 204 and a storage device driver 206. The system APIs 202 reside in the user mode 201 of the operating system 20, and include a file open API 2026 and a file read/write API 2028. The file open API 2026 resides in the user mode 201 of the operating system 20. The file read/write API 2028 resides in the user mode 201 of the operating system 20.

The storage filter driver 204 resides in the kernel mode 200 of the operating system 20, and includes a filtering module 2044, a trusted process module 2046 and a concealed file recording module 2048. The filtering module 2044 is respectively coupled to the file open API 2026 and the file read/write API 2028. The trusted process module 2046 is coupled to the filtering module 2044, and therein stores M first rules and N first characteristics where M is a natural number, and N is an integer equal to or larger than M. Each first rule corresponds to at least one of the N first characteristics. The concealed file recording module 2048 is coupled to the filtering module 2044, and therein stores Q concealed file name rules where Q is a natural number. Each concealed file 2222 corresponds to one of the Q concealed file name rules.

The storage device driver 206 resides in the kernel mode 200 of the operating system 20, and is respectively coupled to the storage filter driver 204 and the data storage device 22.

An application process 208, such as trusted window file managers, untrusted ransomware, etc., resides in the user mode 201 of the operating system 20, and therein stores M second rules and M second characteristics. Each second rule corresponds to one of the first rules and one of the second characteristics. Similar to general operating systems, the operating system 20 also provides relative system APIs 202 for the application processes 208 to perform its functions.

When the application process 208 is started and executed by the at least one processor to search a designated file in the data storage device 22 through the storage device driver 206 in accordance with a designated file path and a designated read/write mode, the application process 208 is respectively coupled to the file open API 2026 and the file read/write API 2028. The storage filter driver 204 judges if there is the designated file in the data storage device 22, and if any, the filtering module 2044 judges if the designated file is one of the L concealed files 2222 in accordance with the Q concealed file name rules. If the judgment result of the filtering module 2044 is positive, the trusted process module 2046 judges if the application process 208 is trusted in accordance with the M first rules, the N first characteristics, the M second rules and the M second characteristics. If the judgment result of the trusted process module 2046 is negative, that is to say, the application process 208 is very likely to be ransomware, the storage filter driver 204 returns without the designated file and returns a message indicating that there is no designated file.

Similarly, in one embodiment, the M first rules can include an original file name, a certification, an issuer company, a product name, a file size, a file version, a check sum or other rules. Thereby, ransomware cannot be judged as a trusted application process.

Further, if the judgment result of the storage device driver 206 is negative, the storage filter driver 204 returns without the designated file and returns a message indicating that there is no designated file.

Further, if the judgment result of the filtering module 2044 is negative, the storage filter driver 204 returns the designated file, the file open API 2026 opens the designated file, and the file read/write API 2028 reads and writes the designated file in accordance with the designated read/write mode.

Further, if the judgment result of the trusted process module 2046 is positive, the storage filter driver 204 returns the designated file, the file open API 2026 opens the designated file, and the file read/write API 2028 reads and writes the designated file in accordance with the designated read/write mode.

Figure 6:
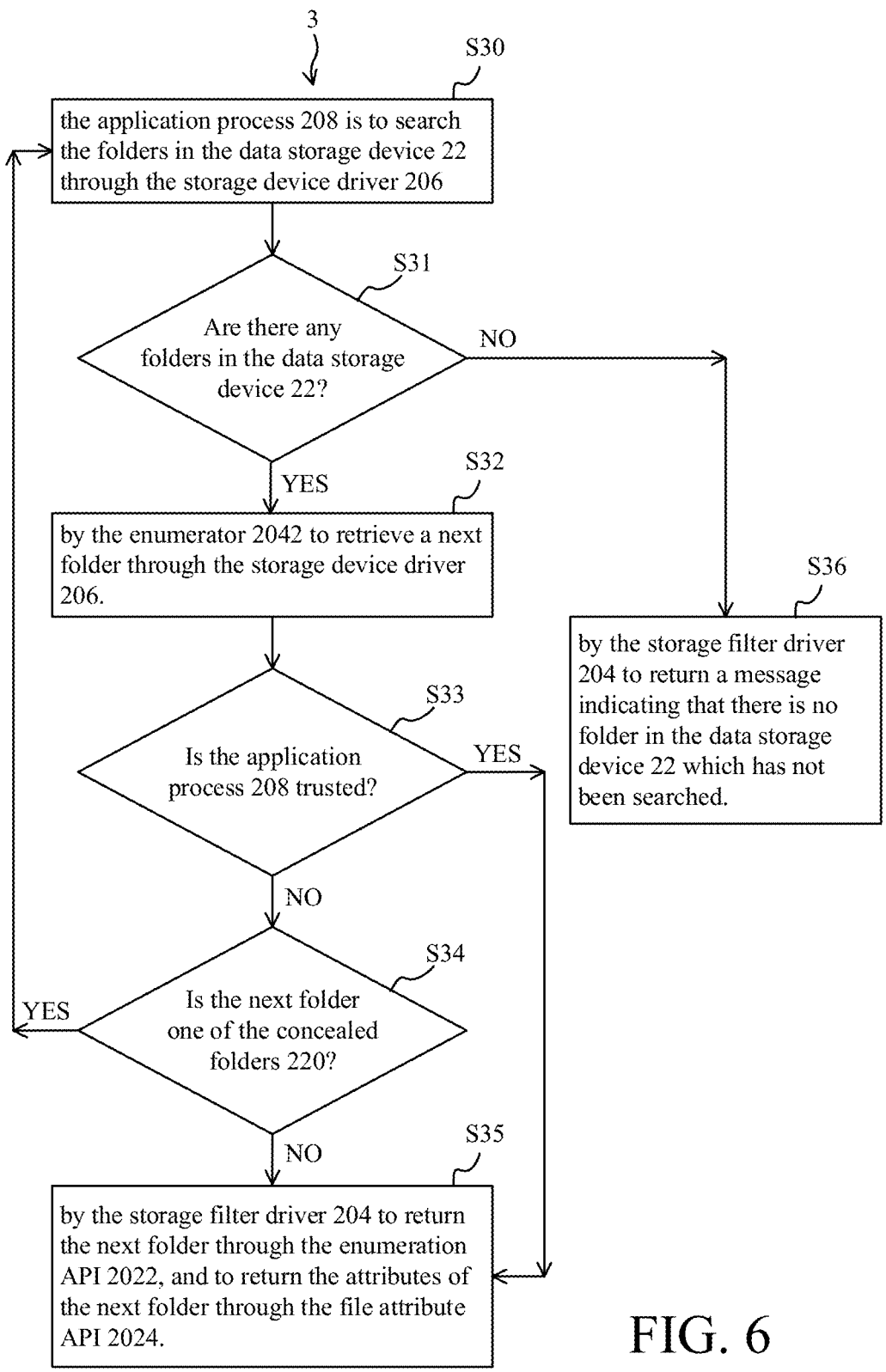
FIG. 6 is a flowchart illustrating a data processing method according to a fourth preferred embodiment of the invention.

Referring to FIG. 6, FIG. 6 is flowchart illustrating a data processing method 3 according to the fourth preferred embodiment of the invention. Regarding the implementation architecture of the data processing method 3 according to the invention, please refer to the architecture of the data processing system 2 as shown in FIG. 4. The data processing method 3 is capable of concealing files and folders. The implementation architecture of the data processing method 3 according to the invention is described hereinafter.

A data storage device 22 therein stores K concealed folders 220 and a plurality of unconcealed folders where K is a natural number. Each of the K concealed folders 220 and the unconcealed folders 222 has a respective attribute. At least one processor (not shown in FIG. 4) is electrically connected to the data storage device 22, and functions in executing an operating system 20. The operating system 20 has a kernel mode 200 and a user mode 201, and includes an enumeration API 2022, a file attribute API 2024, a storage filter driver 204 and a storage device driver 206. The enumeration API 2022 resides in the user mode 201 of the operating system 20. The file attribute API 2024 resides in the user mode 201 of the operating system 20. The storage filter driver 204 resides in the kernel mode 200 of the operating system 20, and includes an enumerator 2042, a filtering module 2044, a trusted process module 2046 and a concealed file recording module 2048. The enumerator 2042 is coupled to the enumeration API 2022. The filtering module 2044 is respectively coupled to the file attribute API 2024 and the enumerator 2042. The trusted process module 2046 is coupled to the filtering module 2044, and therein stores M first rules and N first characteristics where M is a natural number, and N is an integer equal to or larger than M. Each first rule corresponds to at least one of the N first characteristics. The concealed file recording module 2048 is coupled to the filtering module 2044, and therein stores P concealed folder name rules where P is a natural number. Each concealed folder 220 corresponds to one of the P concealed folder name rules. The storage device driver 206 resides in the kernel mode 200 of the operating system 20, and is respectively coupled to the storage filter driver 204 and the data storage device 22. An application process 208 resides in the user mode 201 of the operating system 20, and therein stores M second rules and M second characteristics. Each second rule corresponds to one of the first rules and one of the second characteristics.

Firstly, as shown in FIG. 6, the data processing method 3 according to the fourth preferred embodiment of the invention performs step S30 to respectively couple the application process 208 to the enumeration API 2022 and the file attribute API 2024 when the application process 208 is started and executed by the at least one processor to search the folders in the data storage device 22 through the storage device driver 206.

Next, the data processing method 3 according to the invention performs step S31 by the storage filter driver 204 to judge if there are any folders in the data storage device 22 which have not been searched.

If the judgement result of step S31 is positive, that is to say, it is determined that there are folders in the data storage device 22 which have not been searched, then, the data processing method 3 according to the invention performs step S32 by the enumerator 2042 to retrieve a next folder among the K concealed folders 220 and the plurality of unconcealed folders 222 through the storage device driver 206.

Subsequently, after step S32, the data processing method 3 according to the invention performs step S33 by the trusted process module 2046 to judge if the application process 208 is trusted in accordance with the M first rules, the N first characteristics, the M second rules and the M second characteristics.

In one embodiment, the M first rules can include an original file name, a certification, an issuer company, a product name, a file size, a file version, a check sum or other rules.

If the judgement result of step S33 is negative, that is to say, it is determined that the application process 208 is not trusted, afterward, the data processing method 3 according to the invention performs step S34 by the filtering module 2044 to judge if the next folder is one of the K concealed folders 220 in accordance with the P concealed folder name rules.

If the judgement result of step S34 is positive, that is to say, it is determined that the next folder is one of the K concealed folders 220, next, the data processing method 3 according to the invention does not return the next folder, and jumps back to step S31 by the storage filter driver 204 to continue to judge if there are any folders in the data storage device 22 which have not been searched.

Also as shown in FIG. 6, if the judgement result of step S34 is negative, that is to say, it is determined that the next folder is one of the unconcealed folders 222, then, the data processing method 3 according to the invention performs step S35 by the storage filter driver 204 to return the next folder through the enumeration API 2022, and to return the attribute of the next folder through the file attribute API 2024. After step S35, subsequently, the data processing method 3 according to the invention jumps back to step S31 by the storage filter driver 204 to continue to judge if there are any folders in the data storage device 22 which have not been searched.

Also as shown in FIG. 6, if the judgement result of step S33 is positive, that is to say, it is determined that the application process 208 is trusted, afterward, the data processing method 3 according to the invention performs step S35 by the storage filter driver 204 to return the next folder through the enumeration API 2022, and to return the attributes of the next folder through the file attribute API 2024.

Also as shown in FIG. 6, if the judgement result of step S31 is negative, that is to say, it is determined that there is no folder in the data storage device 22 which has not been searched, next, the data processing method 3 according to the invention performs step S36 by the storage filter driver 204 to return a message indicating that there is no folder in the data storage device 22 which has not been searched.

Figure 7:
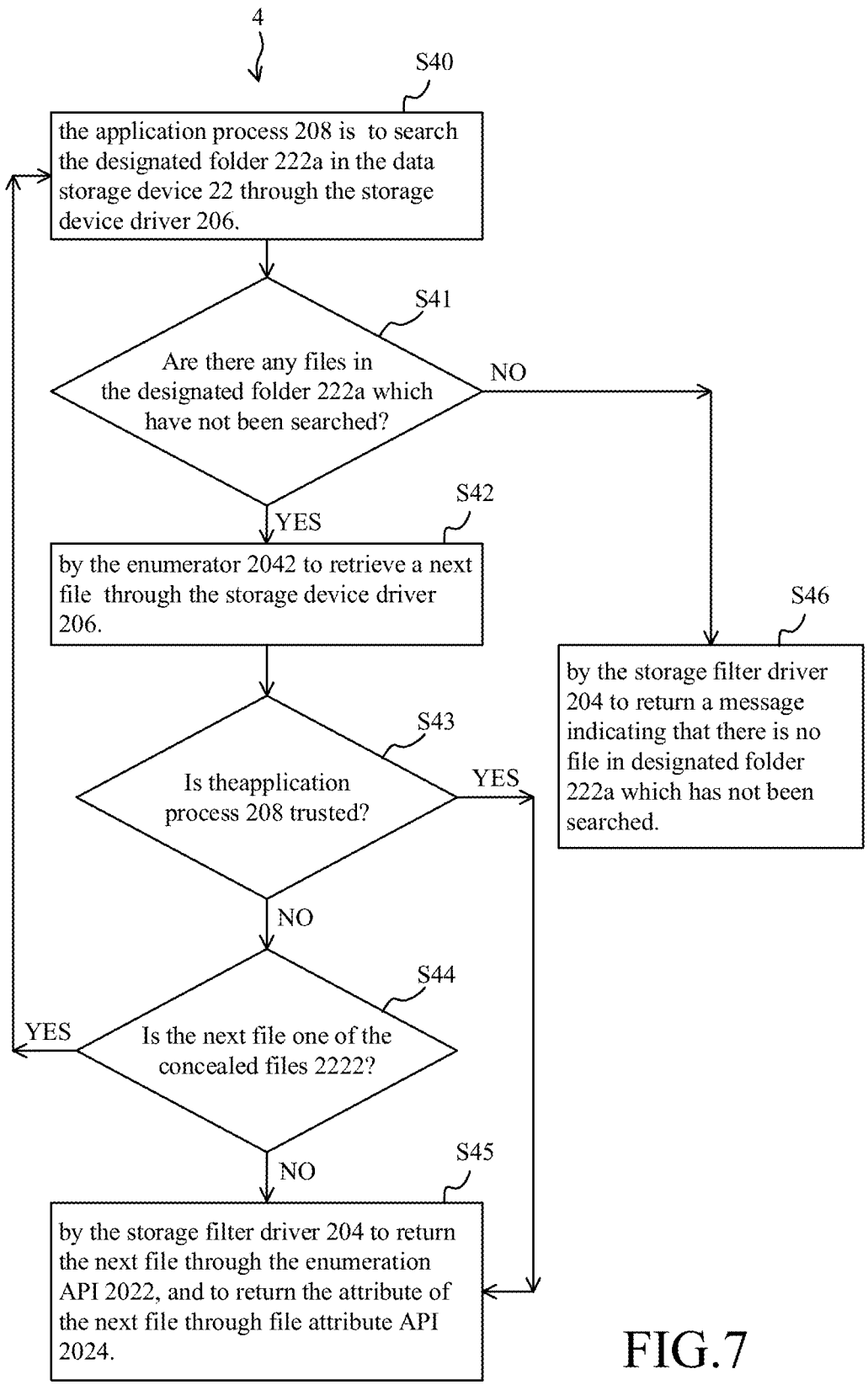
FIG. 7 is a flowchart illustrating a data processing method according to a fifth preferred embodiment of the invention.

Referring to FIG. 7, FIG. 7 is flowchart illustrating a data processing method 4 according to the fifth preferred embodiment of the invention. Regarding the implementation architecture of the data processing method 4 according to the invention, please refer to the architecture of the data processing system 2 as shown in FIG. 4. The data processing method 4 is capable of concealing files and folders. The implementation architecture of the data processing method 4 according to the invention is described hereinafter.

A data storage device 22 therein stores a plurality of concealed folders 220 and a plurality of unconcealed folders 222. The plurality of unconcealed folder 222 include a designated folder 222a. The data storage device 22 therein also stores I concealed files 2222 and a plurality of unconcealed files 2224 where I is a natural number. The concealed files 2222 and the plurality of unconcealed files 2224 are sequentially arranged in the designated folder 222a. Each of the concealed files 2222 and the unconcealed files 2224 has a respective attribute. At least one processor (not shown in FIG. 4) is electrically connected to the data storage device 22, and functions in executing an operating system 20. The operating system 20 has a kernel mode 200 and a user mode 201, and includes an enumeration API 2022, a file attribute API 2024, a storage filter driver 204 and a storage device driver 206. The enumeration API 2022 resides in the user mode 201 of the operating system 20. The file attribute API 2024 resides in the user mode 201 of the operating system 20. The storage filter driver 204 resides in the kernel mode 200 of the operating system 20, and includes an enumerator 2042, a filtering module 2044, a trusted process module 2046 and a concealed file recording module 2048. The enumerator 2042 is coupled to the enumeration API 2022. The filtering module 2044 is respectively coupled to the file attribute API 2024 and the enumerator 2042. The trusted process module 2046 is coupled to the filtering module 2044 and therein storing M first rules and N first characteristics where M is a natural number, and N is an integer equal to or larger than M. Each first rule corresponds to at least one of the N first characteristics. The concealed file recording module 2048 is coupled to the filtering module 2044, and therein stores J concealed file name rules where J is a natural number. Each concealed file 2222 corresponds to one of the J concealed file name rules. The storage device driver 206 resides in the kernel mode 200 of the operating system 20, and is respectively coupled to the storage filter driver 204 and the data storage device 22. An application process 208 resides in the user mode 201 of the operating system 20, and therein stores M second rules and M second characteristics. Each second rule corresponds to one of the first rules and one of the second characteristics.

Firstly, the data processing method 4 according to the fifth preferred embodiment of the invention performs step S40 to respectively coupling to the enumeration API 2022 and the file attribute API 2024 when the application process 208 is started and executed by the at least one processor to search the designated folder 222a in the data storage device 22 through the storage device driver 206.

Next, the data processing method 4 according to the invention performs step S41 by the storage filter driver 204 to judge if there are any files in the designated folder 222a which have not been searched.

If the judgement result of step S41 is positive, that is to say, it determined that there are files in the designated folder 222a which have not been searched, then, the data processing method 4 according to the invention performs step S42 by the enumerator 2042 to retrieve a next file among the I concealed files 2222 and the plurality of unconcealed files 2224 through the storage device driver 206.

Subsequently, after step S42, the data processing method 4 according to the invention performs S43 by the trusted process module 2046 to judge if the application process 208 is trusted in accordance with the M first rules, the N first characteristics, the M second rules and the M second characteristics.

In one embodiment, the M first rules can include an original file name, a certification, an issuer company, a product name, a file size, a file version, a check sum or other rules.

If the judgement result of step S43 is negative, that is to say, it is determined that the application process 208 is not trusted, afterward, the data processing method 4 according to the invention performs step S44 by the filtering module 2044 to judge if the next file is one of the I concealed files 2222 in accordance with the J concealed file name rules.

If the judgement result of step S44 is positive, that is to say, it is determined that the next file is one of the I concealed files 2222, next, the data processing method 4 according to the invention jumps back to step S41 by the storage filter driver 204 to judge if there are any files in the designated folder 222a which have not been searched. That is to say, the storage filter driver 204 does not return the next file.

Also shown in FIG. 7, if the judgement result of step S44 is negative, that is to say, it is determined that the next file is one of the unconcealed files 2222, then, the data processing method 4 according to the invention performs step S45 by the storage filter driver 204 to return the next file through the enumeration API 2022, and to return the attribute of the next file through file attribute API 2024. After step S45, subsequently, the data processing method 4 according to the invention jumps back to step S41 by the storage filter driver 204 to judge if there are any files in the designated folder 222a which have not been searched.

Also shown in FIG. 7, if the judgement result of step S43 is positive, that is to say, it is determined that the application process 208 is trusted, afterward, the data processing method 4 according to the invention performs step S45 by the storage filter driver 204 to return the next file through the enumeration API 2022, and to return the attribute of the next file through file attribute API 2024.

Also shown in FIG. 7, if the judgement result of step S41 is negative, that is to say, it is determined that there is no file in the designated folder 222a which has not been searched, next, the data processing method 4 according to the invention performs step S46 by the storage filter driver 204 to return a message indicating that there is no file in designated folder 222a which has not been searched.

Figure 8:
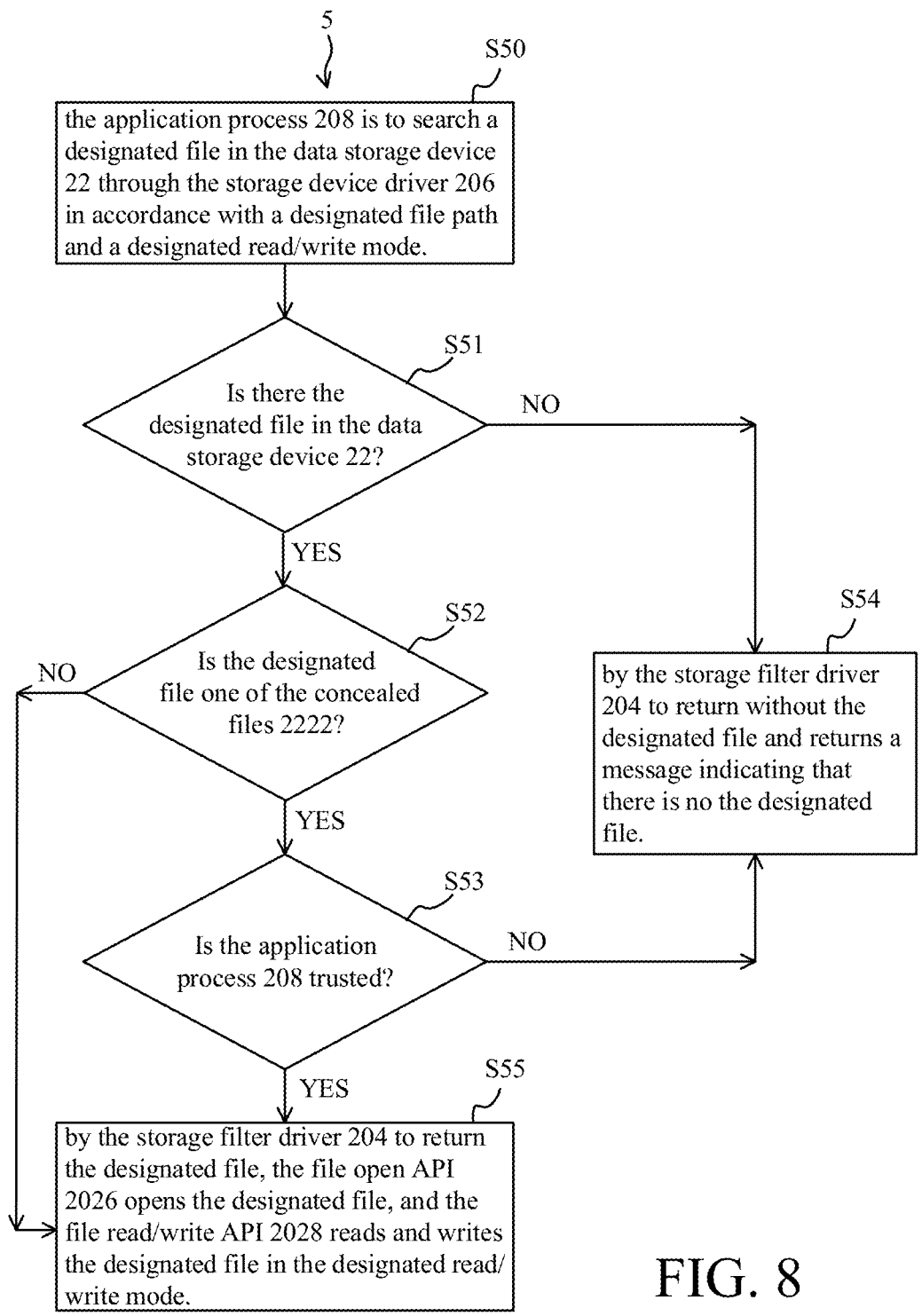
FIG. 8 is a flowchart illustrating a data processing method according to a sixth preferred embodiment of the invention.

Referring to FIG. 8, FIG. 8 is flowchart illustrating a data processing method 5 according to the sixth preferred embodiment of the invention. Regarding the implementation architecture of the data processing method 5 according to the invention, please refer to the architecture of the data processing system 2 as shown in FIG. 5. The data processing method 5 is capable of concealing files and folders. The implementation architecture of the data processing method 5 according to the invention is described hereinafter.

A data storage device 22 therein stores L concealed files 2222 and a plurality of unconcealed files 2224 where L is a natural number. At least one processor (not shown in FIG. 5) is electrically connected to the data storage device 22 and functions in executing an operating system 20. The operating system 20 has a kernel mode 200 and a user mode 201, and includes a file open API 2026, a file read/write API 2028, a storage filter driver 204 and a storage device driver 206. The file open API 2026 resides in the user mode 201 of the operating system 20. The file read/write API 2028 resides in the user mode 201 of the operating system 20. The storage filter driver 204 resides in the kernel mode 200 of the operating system 20, and includes a filtering module 2044, a trusted process module 2046 and a concealed file recording module 2048. The filtering module 2044 is respectively coupled to the file open API 2026 and the file read/write API 2028. The trusted process module 2046 is coupled to the filtering module 2044, and therein stores M first rules, and N first characteristics where M is a natural number, and N is an integer equal to or larger than M. Each first rule corresponds to at least one of the N first characteristics. The concealed file recording module 2048 is coupled to the filtering module 2044, and therein stores Q concealed file name rules where Q is a natural number. Each concealed file 2222 corresponds to one of the Q concealed file name rules. The storage device driver 206 resides in the kernel mode 200 of the operating system 20, and is respectively coupled to the storage filter driver 204 and the data storage device 22. An application process 208 resides in the user mode 201 of the operating system 20, and therein stores M second rules and M second characteristics. Each second rule corresponds to one of the first rules and one of the second characteristics.

Firstly, as shown in FIG. 8, the data processing method 5 according to the fifth preferred embodiment of the invention performs step S50 to respectively couple the application process 208 to the file open API 2026 and the file read/write API 2028 when the application process 208 is started and executed by the at least one processor to search a designated file in the data storage device 22 through the storage device driver 206 in accordance with a designated file path and a designated read/write mode.

Next, the data processing method 5 according to the invention performs step S51 by the storage filter driver 204 to judge if there is the designated file in the data storage device 22.

If the judgement result of step S51 is positive, that is to say, it is determined that there is the designated file in the data storage device 22, then, the data processing method 5 according to the invention performs step S52 by the filtering module 2044 to judge if the designated file is one of the L concealed files 2222 in accordance with the Q concealed file name rules.

If the judgement result of step S52 is positive, that is to say, it is determined that the designated file is one of the L concealed files 2222, subsequently, the data processing method 5 according to the invention is by the trusted process module 2046 to judge if the application process 208 is trusted in accordance with the M first rules, the N first characteristics, the M second rules and the M second characteristics.

In one embodiment, the M first rules can include an original file name, a certification, an issuer company, a product name, a file size, a file version, a check sum or other rules.

If the judgement result of step S53 is negative, that is to say, it determined that the application process 208 is not trusted, afterward, the data processing method 5 according to the invention performs step S54 by the storage filter driver 204 to return without the designated file and returns a message indicating that there is no the designated file.

Also as shown in FIG. 8, if the judgement result of step S51 is negative, that is to say, it is determined that there is no the designated file in the data storage device 22, next, the data processing method 5 according to the invention performs step S54 by the storage filter driver 204 to return without the designated file and returns a message indicating that there is no the designated file.

Also as shown in FIG. 8, if the judgement result of step S52 is negative, that is to say, it is determined that the designated file is one of the unconcealed files 2224, then, the data processing method 5 according to the invention performs step S55 by the storage filter driver 204 to return the designated file, the file open API 2026 opens the designated file, and the file read/write API 2028 reads and writes the designated file in the designated read/write mode.

Also as shown in FIG. 8, if the judgement result of step S53 is positive, that is to say, it is determined that the application process 208 is trusted, subsequently, the data processing method 5 according to the invention performs step S55 by the storage filter driver 204 to return the designated file, the file open API 2026 opens the designated file, and the file read/write API 2028 reads and writes the designated file in the designated read/write mode.

With the detailed description of the above preferred embodiments of the invention, it is clear to understand that the data processing system and the data processing method according to the invention conceal important files and folders to deal with malicious attacks of ransomware on the data processing system. Utilizing the data processing system and the data processing method according to the invention, untrusted ransomware cannot search and obtain these files and folders that have been previously operated by a user to be concealed. Inevitably, ransomware cannot encrypt these concealed files and concealed folders. In this way, important files and folders are protected by concealing them. Once the data processing system according to the invention is attacked by ransomware, these concealed important files and folders can be quickly restored in a simple way, for example, a way of moving the data storage device to an uninfected data processing system to read and copy concealed files and concealed folders.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A data processing system, comprising:
   a data storage device, therein storing K concealed folders and a plurality of unconcealed folders, K being a natural number, each of the K concealed folders and the unconcealed folders having a respective attribute; and
   at least one processor, being electrically connected to the data storage device and functioning in executing an operating system, the operating system having a kernel mode and a user mode and comprising:
   an enumeration application programming interface (API), residing in the user mode;
   a file attribute API, residing in the user mode;
   a storage filter driver, residing in the kernel mode and comprising:
   an enumerator, coupled to the enumeration API;
   a filtering module, respectively coupled to the file attribute API and the enumerator;
   a trusted process module, being coupled to the filtering module and therein storing M first rules and N first characteristics, M being a natural number, N being an integer equal to or larger than M, each first rule corresponding to at least one of the N first characteristics; and a concealed file recording module, being coupled to the filtering module and therein storing P concealed folder name rules, P being a natural number, wherein each concealed folder corresponds to one of the P concealed folder name rules; and a storage device driver, residing in the kernel mode and being respectively coupled to the storage filter driver and the data storage device;

wherein an application process resides in the user mode and therein stores M second rules and M second characteristics, each second rule corresponds to one of the first rules and one of the second characteristics, when the application process is started and executed by the at least one processor to search the folders in the data storage device through the storage device driver, the application process is respectively coupled to the enumeration API and the file attribute API, the storage filter driver judges if there are any folders in the data storage device which have not been searched, and if any, the enumerator retrieves a next folder among the K concealed folders and the plurality of unconcealed folders through the storage device driver, and the trusted process module judges if the application process is trusted in accordance with the M first rules, the N first characteristics, the M second rules and the M second characteristics, and if NO, the filtering module judges if the next folder is one of the K concealed folders in accordance with the P concealed folder name rules, and if YES, the storage filter driver returns without the next folder and continues to judge if there are any folders in the data storage device which have not been searched.

2. The data processing system of claim 1, wherein the M first rules comprises one selected from the group consisting of an original file name, a certification, an issuer company, a product name, a file size, a file version, and a check sum.

3. A data processing system, comprising:
a data storage device, therein storing at least one folder, I concealed files and a plurality of unconcealed files, I being a natural number, the I concealed files and the plurality of unconcealed files being sequentially arranged in a designated folder of the at least one folder, each of the I concealed files and the unconcealed files having a respective attribute; and at least one processor, being electrically connected to the data storage device and functioning in executing an operating system, the operating system having a kernel mode and a user mode and comprising:

an enumeration application programming interface (API), residing in the user mode;

a file attribute API, residing in the user mode;

a storage filter driver, residing in the kernel mode and comprising:

an enumerator, coupled to the enumeration API;

a filtering module, respectively coupled to the file attribute API and the enumerator;

a trusted process module, being coupled to the filtering module and therein storing M first rules and N first characteristics, M being a natural number, N being an integer equal to or larger than M, each first rule corresponding to at least one of the N first characteristics; and a concealed file recording module, being coupled to the filtering module and therein storing J concealed file name rules, J being a natural number, wherein each concealed file corresponds to one of the J concealed file name rules; and a storage device driver, residing in the kernel mode and being respectively coupled to the storage filter driver and the data storage device;

wherein an application process resides in the user mode and therein stores M second rules and M second characteristics, each second rule corresponds to one of the first rules and one of the second characteristics, when the application process is started and executed by the at least one processor to search the designated folder in the data storage device through the storage device driver, the application process is respectively coupled to the enumeration API and the file attribute API, the storage filter driver judges if there are any files in the designated folder which have not been searched, and if any, the enumerator retrieves a next file among the I concealed files and the plurality of unconcealed files through the storage device driver, and the trusted process module judges if the application process is trusted in accordance with the M first rules, the N first characteristics, the M second rules and the M second characteristics, and if NO, the filtering module judges if the next file is one of the I concealed files in accordance with the J concealed file name rules, and if YES, the storage filter driver returns without the next file and continues to judge if there are any files in the designated folder which have not been searched.

4. The data processing system of claim 3, wherein the M first rules comprises one selected from the group consisting of an original file name, a certification, an issuer company, a product name, a file size, a file version, and a check sum.

5. A data processing system, comprising:
a data storage device, therein storing L concealed files and a plurality of unconcealed files, L being a natural number; and at least one processor, being electrically connected to the data storage device and functioning in executing an operating system, the operating system having a kernel mode and a user mode and comprising:

a file open application programming interface (API), residing in the user mode;

a file read/write API, residing in the user mode;

a storage filter driver, residing in the kernel mode and comprising:

a filtering module, respectively coupled to the file open API and the file read/write API;

a trusted process module, being coupled to the filtering module and therein storing M first rules and N first characteristics, M being a natural number, N being an integer equal to or larger than M, each first rule corresponding to at least one of the N first characteristics; and a concealed file recording module, being coupled to the filtering module and therein storing Q concealed file name rules, Q being a natural number, wherein each concealed file corresponds to one of the Q concealed file name rules; and a storage device driver, residing in the kernel mode and being respectively coupled to the storage filter driver and the data storage device;

wherein an application process resides in the user mode and therein stores M second rules and M second characteristics, each second rule corresponds to one of the first rules and one of the second characteristics, when the application process is started and executed by the at least one processor to search a designated file in the data storage device through the storage device driver in accordance with a designated file path and a designated read/write mode, the application process is respectively coupled to the file open API and the file read/write API, the storage filter driver judges if there is the designated file in the data storage device, and if any, the filtering module judges if the designated file is one of the L concealed files in accordance with the Q concealed file name rules, and if YES, the trusted process module judges if the application process is trusted in accordance with the M first rules, the N first characteristics, the M second rules and the M second characteristics, and if NO, the storage filter driver returns without the designated file and returns a message indicating that there is no designated file.

6. The data processing system of claim 5, wherein the M first rules comprises one selected from the group consisting of an original file name, a certification, an issuer company, a product name, a file size, a file version, and a check sum.

7. A data processing method, wherein a data storage device therein stores K concealed folders and a plurality of unconcealed folders, K is a natural number, each of the K concealed folders and the unconcealed folders has a respective attribute, at least one processor is electrically connected to the data storage device and functions in executing an operating system, the operating system has a kernel mode and a user mode, and comprises an enumeration application programming interface (API), a file attribute API, a storage filter driver and a storage device driver, the enumeration API resides in the user mode, the file attribute API resides in the user mode, the storage filter driver resides in the kernel mode and comprises an enumerator, a filtering module, a trusted process module and a concealed file recording module, the enumerator is coupled to the enumeration API, the filtering module is respectively coupled to the file attribute API and the enumerator, the trusted process module is coupled to the filtering module and therein stores M first rules and N first characteristics, M is a natural number, N is an integer equal to or larger than M, each first rule corresponds to at least one of the N first characteristics, the concealed file recording module is coupled to the filtering module and therein stores P concealed folder name rules, P is a natural number, each concealed folder corresponds to one of the P concealed folder name rules, the storage device driver resides in the kernel mode and is respectively coupled to the storage filter driver and the data storage device, an application process resides in the user mode and therein stores M second rules and M second characteristics, each second rule corresponds to one of the first rules and one of the second characteristics, said data processing method comprises the steps of:
  (a) when the application process is started and executed by the at least one processor to search the folders in the data storage device through the storage device driver, respectively coupling the application process to the enumeration API and the file attribute API;
  (b) by the storage filter driver, judging if there are any folders in the data storage device which have not been searched;
  (c) if YES in step (b), performing the steps of:
  (d) by the enumerator, retrieving a next folder among the K concealed folders and the plurality of unconcealed folders through the storage device driver;
  (e) by the trusted process module, judging if the application process is trusted in accordance with the M first rules, the N first characteristics, the M second rules and the M second characteristics;
  (f) if NO in step (e), performing the steps of:
  (g) by the filtering module, judging if the next folder is one of the K concealed folders in accordance with the P concealed folder name rules;
  (h) if YES in step (g), performing the steps of:
  (i) by the storage filter driver, returning without the next folder and continuing to judge if there are any folders in the data storage device which have not been searched.

8. The data processing method of claim 7, wherein the M first rules comprises one selected from the group consisting of an original file name, a certification, an issuer company, a product name, a file size, a file version, and a check sum.

9. A data processing method, wherein a data storage device therein stores L concealed files and a plurality of unconcealed files, L is a natural number, at least one processor is electrically connected to the data storage device and functions in executing an operating system, the operating system has a kernel mode and a user mode, and comprises a file open application programming interface (API), a file read/write API, a storage filter driver and a storage device driver, the file open API resides in the user mode, the file read/write API resides in the user mode, the storage filter driver resides in the kernel mode and comprises a filtering module, a trusted process module and a concealed file recording module, the filtering module is respectively coupled to the file open API and the file read/write API, the trusted process module is coupled to the filtering module and therein stores M first rules and N first characteristics, M is a natural number, N is an integer equal to or larger than M, each first rule corresponds to at least one of the N first characteristics, the concealed file recording module is coupled to the filtering module and therein stores Q concealed file name rules, Q is a natural number, each concealed file corresponds to one of the Q concealed file name rules, the storage device driver resides in the kernel mode and is respectively coupled to the storage filter driver and the data storage device, an application process resides in the user mode and therein stores M second rules and M second characteristics, each second rule corresponds to one of the first rules and one of the second characteristics, said data processing method comprises the steps of:
  (a) when the application process is started and executed by the at least one processor to search a designated file in the data storage device through the storage device driver in accordance with a designated file path and a designated read/write mode, respectively coupling the application process to the file open API and the file read/write API;
  (b) by the storage filter driver, judging if there is the designated file in the data storage device;
  (c) if YES in step (b), performing the steps of:
  (d) by the filtering module, judging if the designated file is one of the L concealed files in accordance with the Q concealed file name rules;
  (e) if YES in step (d), performing the steps of:
  (f) by the trusted process module, judging if the application process is trusted in accordance with the M first rules, the N first characteristics, the M second rules and the M second characteristics; and
  (g) if NO in step (f), performing the steps of:
  (h) by the storage filter driver, returning without the designated file and returning a message indicating that there is no designated file.

10. The data processing method of claim 9, wherein the M first rules comprises one selected from the group consisting of an original file name, a certification, an issuer company, a product name, a file size, a file version, and a check sum.

* * * * *